United States Patent [19]

Duxbury et al.

[11] Patent Number: 5,604,896
[45] Date of Patent: Feb. 18, 1997

[54] COMPUTER WITH TERMINAL EMULATION INTERFACE FOR MULTI-ENVIRONMENT CLIENT/SERVER APPLICATIONS

[75] Inventors: Paul Duxbury, Sandbach; Robert C.-W. Yau, London, both of England

[73] Assignee: International Computers Limited, London, England

[21] Appl. No.: 628,195

[22] Filed: Apr. 5, 1996

Related U.S. Application Data

[63] Continuation of Ser. No. 273,196, Jul. 11, 1994, abandoned.

[30] Foreign Application Priority Data

Jul. 13, 1993 [GB] United Kingdom .................... 9314460

[51] Int. Cl.[6] .......................................................... G06F 9/455
[52] U.S. Cl. .................. 395/500; 395/200.18; 364/225.2
[58] Field of Search ....................... 395/500, 200, 395/800, 200.18; 364/200; 379/93; 370/13, 94.1, 58.1, 79; D1/364, 225.2

[56] References Cited

U.S. PATENT DOCUMENTS

| | | | |
|---|---|---|---|
| 4,688,170 | 8/1987 | Waite et al. | 364/200 |
| 5,239,662 | 8/1993 | Danielson et al. | 395/800 |
| 5,276,732 | 1/1994 | Stent et al. | 379/93 |
| 5,278,823 | 1/1994 | Handel | 370/13 |
| 5,311,577 | 5/1994 | Madrid et al. | 379/93 |
| 5,325,361 | 6/1994 | Lederer et al. | 370/94.1 |
| 5,329,619 | 7/1994 | Page et al. | 395/200 |
| 5,359,598 | 10/1994 | Steagall et al. | 370/58.1 |
| 5,371,736 | 12/1994 | Evan | 370/79 |
| 5,371,852 | 12/1994 | Attanasio et al. | 395/200 |
| 5,377,259 | 12/1994 | Butler et al. | 379/93 |
| 5,402,474 | 3/1995 | Miller et al. | 379/93 |
| 5,440,719 | 8/1995 | Hanes et al. | 395/500 |

FOREIGN PATENT DOCUMENTS

| | | |
|---|---|---|
| 0237671 | 9/1987 | European Pat. Off. . |
| 0449449 | 10/1991 | European Pat. Off. . |

OTHER PUBLICATIONS

Yochelson, "HLLAPI: The bridge from DOS and Unix to mainframes", Data Communications, vol. 18, No. 15, Nov. 21, 1989, pp. 51–59.

IBM Technical Disclosure Bulletin, vol. 32, No. 5A, Oct. 1989, pp. 317–318.

Primary Examiner—Kevin J. Teska
Assistant Examiner—Russell W. Frejd
Attorney, Agent, or Firm—Lee, Mann, Smith, McWilliams, Sweeney and Ohlson

[57] ABSTRACT

A computer system comprises first and second processing environments interconnected by a gateway. The gateway emulates a terminal in the second environment, converting service requests from a client in the first environment into dialogues on the emulated terminal by executing scripts in a scripting language. This allows client applications in the first environment to communicate with server applications in the second environment in a way that is completely transparent to the clients. The client is not aware that it is communicating with the server through a dialogue on an emulated terminal; all knowledge of the dialogue is embodied in the scripts. This is of utility in integrating legacy computer sytems with new systems.

5 Claims, 2 Drawing Sheets

COMPUTER WITH TERMINAL EMULATION INTERFACE FOR MULTI-ENVIRONMENT CLIENT/SERVER APPLICATIONS

This application is a continuation, of application Ser. No. 08/273,196, filed Jul. 11, 1994 now abandoned.

BACKGROUND TO THE INVENTION

This invention relates to computer systems and, more specifically is concerned with integration of such systems.

The introduction of new computer systems and applications is frequently complicated by the existence of legacy systems and applications (ie those already in use by the customer), whose immediate replacement is not practical. It is desirable to provide some way of integrating such legacy systems and applications with new systems and applications, allowing both to be used side-by-side, so that the new systems can be phased in more gradually.

Several integration products are already on the market. However, their coverage is usually limited and they often require some modification to the target application or its host system.

The object of the present invention is to provide a novel means for integration, which reduces these problems.

SUMMARY OF THE INVENTION

According to the invention there is provided a computer system comprising a first processing environment, a second processing environment and a gateway interconnecting the environments to allow a client application in the first environment to send service requests to a server application in the second environment, wherein the gateway includes terminal emulation means for emulating a terminal in the second environment, and means for converting service requests from a client in the first environment into dialogues on said terminal by executing scripts in a scripting language.

It will be shown that the invention allows client applications to communicate with server applications in other environments in a way that is completely transparent to the clients. The client is not aware that it is communicating with the server through a dialogue on an emulated terminal; all knowledge of the dialogue is embodied in the scripts.

DESCRIPTION OF AN EMBODIMENT OF THE INVENTION

One embodiment of the invention will now be described by way of example with reference to the accompanying drawings.

SYSTEMS TO BE INTEGRATED

Figure 1:
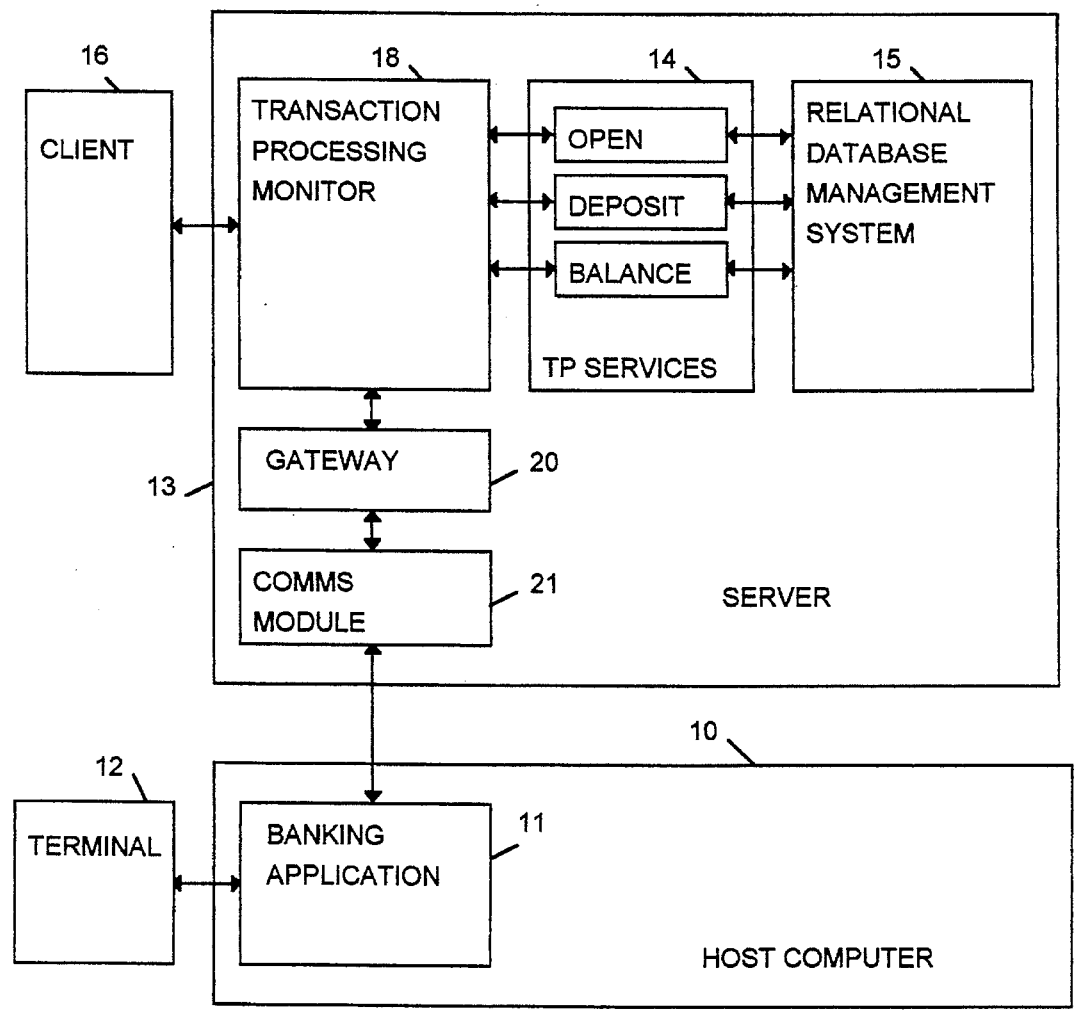
FIG. 1 is a block diagram of an integrated computer system.

Referring to FIG. 1, it is assumed in this example that a banking organisation has a legacy computer system consisting of at least one host computer 10 which runs a banking application 11. The banking application maintains customer account data, and can perform various operations such as opening or closing accounts, and transferring funds between accounts. The application is accessible only through dumb terminals 12, e.g. VT100 terminals, connected to the computer 10.

It is assumed that the bank wishes to introduce a new computer system to replace this existing system. The new application runs on a computer system 13 (e.g. an ICL DRS6000 computer, running under the UNIX operating system), and comprises a number of server applications 14. Each of the server applications 14 provides a particular banking service, such as open (open an account), deposit (make a deposit in an account), balance (provide a balance on an account) and transfer (transfer funds from one account to another). The servers are supported by a relational database management system (RDBMS) 15, which holds the customer and account data. The system 13 can be accessed from a number of PC (personal computer) clients 16 which run graphical user interface (GUI) software, to provide a convenient and attractive service to the users. A transaction processing (TP) monitor 18 provides a distributed processing environment in which the PC clients can interact with the server applications. The TP monitor 18 may, for example, be the TUXEDO product. (TUXEDO is a trade mark of UNIX System Laboratories Inc.)

It is further assumed that the bank wishes to migrate incrementally from the old system to the new, one branch at a time. This means that the old and new systems must coexist for some transition period, and that it is therefore necessary to connect the two systems together in some way to provide to users the appearance of a single integrated system.

THE INTEGRATED SYSTEM

The way in which the two systems are integrated to achieve this goal is as follows.

The system 13 is provided with a gateway 20, connected to the remote host computer 10 by way of a communications module 21. The TP monitor steers service requests from clients 16 according to the value of a branch identity code in the request: requests relating to accounts held at bank branches that have migrated to the new system are steered to the appropriate one of the servers 15, while requests relating to accounts held at branches that have not yet migrated are steered to the gateway 20, and hence to the remote application 11.

As far as the TP monitor 18 is concerned, the gateway 20 looks exactly like one of the servers 15. On the other hand, viewed from the old application 11, the gateway 20 emulates a VT100 terminal, and converts the service requests from the TP monitor into old-style VT100 dialogues. In other words, as far as the old application is concerned, the gateway looks exactly like one of the terminals 12 of its host system.

The new and old modes of access are indistinguishable to the end-user and the GUI client software, including the ability to transfer funds between the old and new regimes.

GATEWAY

Figure 2:
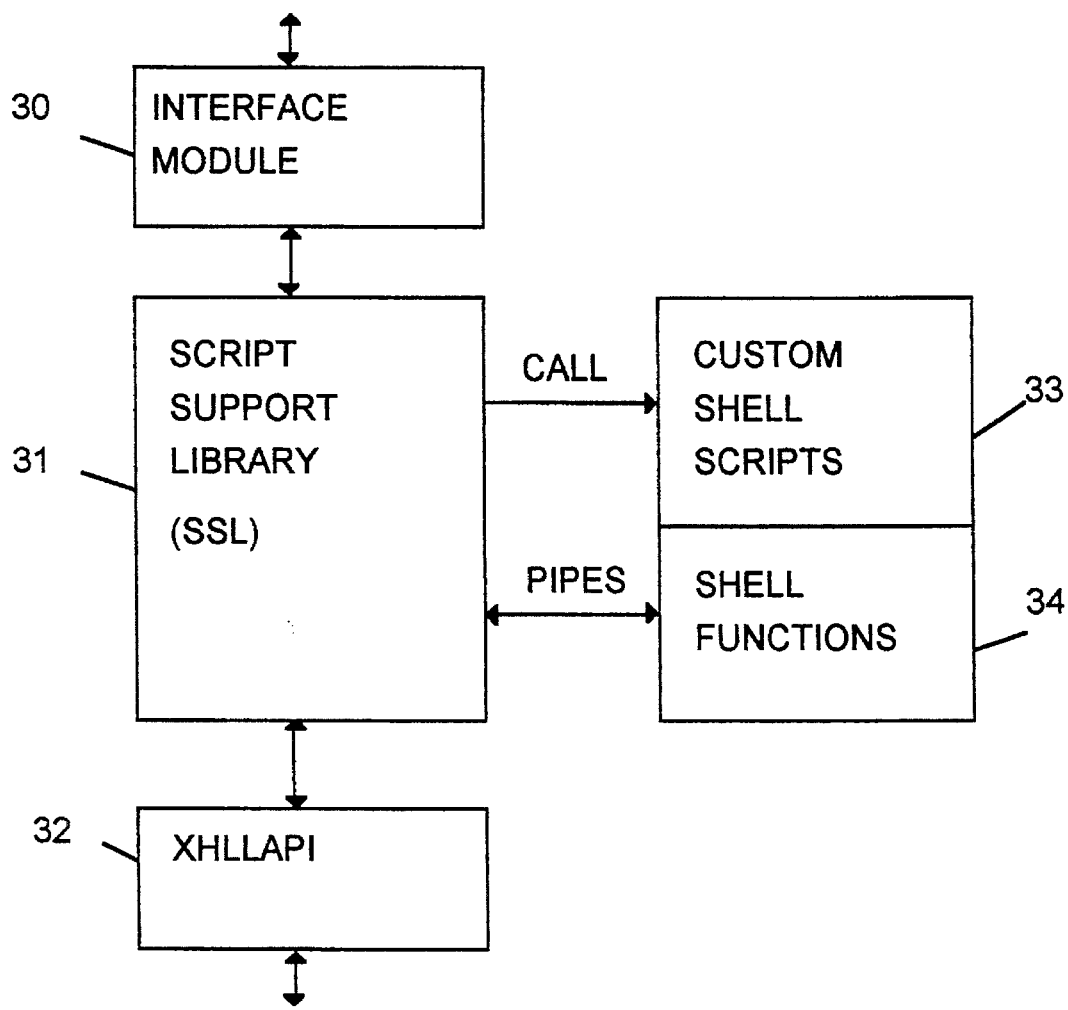
FIG. 2 is a block diagram showing a gateway unit in more detail.

The gateway 20 will now be described in more detail with reference to FIG. 2.

The gateway comprises an interface module 30, a script support library (SSL) 31, and an XHLLAPI (extended high level language applications programming interface) 32. The gateway also has associated with it a set of UNIX shell scripts 33 and a set of UNIX shell functions 34.

As mentioned above, the purpose of the gateway is to emulate a terminal for the old application, and to convert service requests from the TP monitor into dialogues between the emulated terminal and the old application. These dialogues are defined by the custom shell scripts 33, each service request having a corresponding shell script. For example, each of the open, deposit, balance and transfer services mentioned above has a corresponding custom shell script. In addition, other shell scripts are provided for functions such as remote logging on to the host 10.

The shell functions 34 provide a set of standard procedures for use by the custom shell scripts.

The interface module 30 is a C language module. As far as the TP monitor is concerned, the interface module acts in the same way as a standard server, advertising its services to the TP monitor, receiving service request messages from the TP monitor, and then issuing responses back to the TP monitor. When the interface module receives a service request from the TP monitor, it derives the name of the corresponding shell script from the request. It then decides whether the script needs to be started. (As will be described, a script may have issued a call to stay resident, and in that case it will not need restarting). The interface module also converts the parameters of the request into shell variables, so that they can be used by the shell script, and converts the results returned by the shell script back into a form usable by the TP monitor.

The script support library (SSL) 31 is a set of C language functions, embodying all the script and session control functionality of the gateway. It presents a high level function interface for use by the interface module, mapping service requests on to script invocations and lower level XHLLAPI calls. The SSL includes a function ssl_run_script which starts a specified shell script, by means of UNIX fork and exec system calls. It also includes a function ssl_wait which waits for termination of a specified shell script and then returns the results of running the script to the interface module. While waiting for termination of a shell script, ssl_wait handles any XHLLAPI requests from the shell functions 34. The shell functions 34 communicate with the script support library (SSL) 31 by way of a UNIX pipe interface. XHLLAPI requests from the shell functions are piped to the SSL, and the results from the XHLLAPI operations are piped back to the functions.

The SSL allows an emulated terminal session to be represented to the clients as a set of logical transaction services, implemented by the scripts. The terminal session is owned by the SSL process, and therefore several scripts can be run sequentially on the same session (that is, a session does not need to terminate when a script exits), provided that each script leaves the session in a well-defined state. Thus, a single terminal session can be shared between many clients on a transaction-by-transaction basis. This reduces the number of sessions required and so improves the efficiency of the system.

A separate instance of a custom shell script may be run for each transaction. However, this may be inefficient for frequently used scripts. To reduce this inefficiency, an initialisation script may choose not to exit, but to continue running in parallel to service all subsequent transactions. In this case, when a request arrives at the gateway, it is forwarded to the already running script (using an SSL function ssl_send) rather than being used to invoke a new instance of the script. The script itself must loop around, reading new commands (using a shell function tsh_receive) and branching to an appropriate routine to service the request.

XHLLAPI 32 is a library of C language functions which perform the terminal emulation, allowing a client program to operate an interactive session with the remote host 10. The XHLLAPI maintains an area of memory referred to as the presentation space (PS) which represents the virtual screen of the emulated terminal, along with a virtual keyboard. It also maintains current cursor and saved cursor values which point to locations on the virtual screen. XHLLAPI provides operations on these resources which simulate a human user's access to a physical terminal, such as screen reading and searching, and processing of simulated keystrokes. XHLLAPI appears to the host as an ordinary interactive terminal, and so no special host software is required.

In this example, the emulated terminal is asynchronous, i.e. it uses an asynchronous protocol to communicate with the host 10. A major consideration with an asynchronous service is how a script is to deduce when the host output has finished. (This problem does not arise for blocked mode protocols, where there is an explicit "keyboard unlocked" state). For asynchronous terminals, the script has to deduce this state from application-dependent changes made by the host to the virtual screen. However, continual reading of the virtual screen by the script over the UNIX pipe interface would clearly be inefficient. For this reason, the shell functions include a tsh_pause function which allows a script to declare a set of simply testable events, based on screen contexts and other factors, and to pause while waiting for one of these events to be triggered. XHLLAPI keeps statistics of operations performed on the virtual screen by the remote host, including number of line feeds, characters, and screen clears. These statistics can be used by the tsh_pause function as triggers, eg to trigger an event after a given number of new lines have been processed.

SCRIPT SUPPORT LIBRARY (SSL)

The following functions are provided by the script support library.

ssl_init options

This function initializes the SSL. It also calls the XHLLAPI_INIT function to initialize XHLLAPI, and the XHLLAPI_PARAMS function, to pass options parameters. The ssl_init function must be called before any other functions are used.

ssl_deinit

This function deinitializes the SSL, by freeing memory space and tidying up the memory. It should be the final SSL function called before the system 14 is powered down.

ssl_connect (host_address)

This starts a terminal session to the host 10, by invoking the XHLLAPI_ASSOC_PS function. The function returns a session handle which can be used for subsequent identification of the session.

ssl_disconnect

This stops a terminal session to the remote host 10 by invoking the XHLLAPI_DISSOC_PS function.

ssl_select (session_handle)

This selects a session, making it the current session on which subsequent requests operate. The session must have been previously connected by the ssl_connect function. Only one session can be current at any given time.

ssl_deselect

This deselects the current session, leaving no session current.

ssl_run_script (session_handle,script_name,parameters)

This starts a specified one of the custom shell scripts, to run on the currently selected session, by fork and exec system calls with the supplied parameters. These parameters consist of a sequence of items of the form name=value, which are added to the environment of the child process. They are then available to the shell script as shell variables. The function returns a script handle which can be used subsequently to reference the running script. Multiple script instances may be run concurrently, each being assigned a script handle and associated with a single session. However, only one script may be active for a given session at any one time; any other scripts associated with the same session will be in a dormant state.

ssl_wait (script_handle,script_reply, len)

This waits for a specified script to terminate by making a call to the tsh_return shell function. Script_reply points to a buffer of length len that is to receive the results returned by the shell script. While waiting, ssl_wait services any requests received from the shell functions by way of the pipe interface, by invoking the appropriate XHLLAPI functions. When the specified script terminates, ssl_wait returns the results of the shell script to the interface module.

ssl_send (script_handle,parameters,message)

This sends a new message to a specified resident script (ie one that has previously called the tsh_return function with result code=1). The parameters are a sequence of items of the form name=value which are added to the environment of the script.

SHELL FUNCTIONS

The following shell functions are provided.

tsh_keys string

This sends a string of emulated keystrokes to the target session, using the XHLLAPI_DO_KEYS function.

tsh_read var row column size

This uses the XHLLAPI_COPY_FROM_PS function to read the contents of a specified area of the virtual screen, and writes the data into the named shell variable.

tsh_readmsg var1 var2 . . . varN

This uses the XHLLAPI_READMSG function to read the contents of the virtual screen between the saved cursor and the current cursor, and writes the data into the named shell variables.

tsh_search row column string

This uses the XHLLAPI_SEARCH_PS function to search the virtual screen for a specified string, starting at a given row/column address.

tsh_write row column string

This writes a specified string to the virtual screen, starting at a given row/column location, using the XHLLAPI_COPY_TO_PS function.

tsh_compare row column string

This uses the XHLLAPI_COPY_FROM_PS function to obtain the contents of the virtual screen (PS) at the specified row, column address, and then compares this with a specified string value. The address may be either absolute, or relative to the current cursor position.

tsh_getcursor

This returns the current cursor position, using the XHLLAPI_CURSOR function.

tsh_savecursor

This saves the current cursor position, by means of the XHLLAPI_SAVE function. The saved cursor can then be used as an alternative base for addressing the virtual screen PS.

tsh_restore

This restores the current cursor to its saved value, by means of the XHLLAPI_RESTORE function.

tsh_getsaved

This returns the saved cursor position, using the XHLLAPI_GETSAVED function.

tsh_setcursor row column

This sets the current cursor position to the specified row and column, by means of the XHLLAPI_SETCURSOR function.

tsh_setsaved row column

This explicitly sets the saved cursor position to the specified row and column, by means of the XHLLAPI_SETSAVED function.

tsh_wait

This function waits until it detects a "keyboard unlocked" state, using the XHLLAPI_WAIT function. It can be used to detect completion of host output in the case where the terminal used a blocked mode protocol.

tsh_pause options

This function pauses until triggered by any of the events specified by a list of options. The events that may be specified include:

a pause in the host output, the output of a specified number of new lines from the host, the presence of a particular string at a specified location of the virtual screen, the output of a particular string from the host, the presence of the cursor within a specified range of positions.

The tsh_pause function makes use of the XHLLAPI_PAUSE function to detect the occurrence of events, the XHLLAPI_QUERY_HOST function to obtain information about a detected event, and the XHLLAPI_COPY_FROM_PS function to read the virtual screen so as to check whether the detected event is one of the specified events for which tsh_pause is waiting.

tsh_return result_code string

This function returns a numeric result code to the SSL, along with a result string. The following result codes are available:

0 success: the shell script has finished.

1 terminate but stay resident: the script is now ready to accept new requests by way of the tsh_receive shell function.

2 immediate return: this is used to pass back a partial result rather than terminating.

3 acceptable failure: the shell script has detected an error and needs to be terminated.

−1 catastrophic failure: the shell script is in a state from which it cannot recover, and so the session needs to be terminated, and the gateway restarted.

tsh_receive message

This is used by scripts that have opted to terminate but stay resident, to accept new requests. When a request arrives, tsh_receive returns the message in a shell variable whose name was supplied by the caller.

tsh_env "name1=value1 name2=value2 . . . nameN=valueN"

This function passes a string of space-separated name=value pairs to the SSL to be exported as environment variables, thus allowing existing or successive scripts to have access to these variables.

tsh_options "opt1 opt2 . . . optN"

This uses the XHLLAPI_PARAMS function to set one or more XHLLAPI option parameters.

XHLLAPI

All XHLLAPI operations are initiated by means of a single function call interface XHLLAPI() which has four parameters as follows:

func: a function code buff: a buffer, for holding a string of virtual screen or keyboard data.

size: the length of the data in the buffer.

pos: a virtual screen position; also used to return a result code.

The function code defines the following functions.

XHLLAPI_INIT

This initialises the XHLLAPI interface. It must be the first XHLLAPI operation performed by a process. It must also be called after an XHLLAPI_DEINIT if it is required to use XHLLAPI again. XHLLAPI_DEINIT This clears down the XHLLAPI interface after use, by dissociating all current sessions and releasing resources.

XHLLAPI_RESET

This resets the XHLLAPI interface by dissociating all sessions, releasing all resources, and breaking all host connections, leaving XHLLAPI initialised and ready for use.

XHLLAPI_PARAMS

This sets various option parameters to control aspects of the operation of subsequent commands, such as time-outs and addressing bases.

XHLLAPI_ASSOC_PS

This associates a new session with a client, and connects it to the target host. The client provides a single-character short name by which to refer to the session subsequently, and an address by which to reach the target host.

XHLLAPI_DISSOC_PS

This dissociates a session (referenced by a specified short name) from the client, disconnects it from the target host, and releases any resources associated with the session. The short name is deallocated.

XHLLAPI_CONNECT_PS

This selects a session (referenced by a specified short name) as the current session.

XHLLAPI_DISCONNECT_PS

This deselects the current session, leaving no session currently selected.

XHLLAPI_WAIT

This causes XHLLAPI to wait for any output currently outstanding or in progress on the current host session to complete. It is used to wait for a host reply to a simulated keyboard input, or to poll for unsolicited host output.

XHLLAPI_PAUSE

This causes XHLLAPI to wait for an event (i.e. an update to the virtual screen PS) on any of a specified list of sessions, subject to a timeout. The list is set up by calls to XHLLAPI_START_NOTIFY. On completion, details of the event may be obtained through XHLLAPI_QUERY_HOST.

XHLLAPI_START NOTIFY

This adds the short name of a specified session to a poll list, for use by the XHLLAPI_PAUSE function.

XHLLAPI_STOP NOTIFY

This removes the short name of a specified session from the poll list.

XHLLAPI_QUERY_HOST

This returns information about an event detected by XHLLAPI_PAUSE. The information includes a result code indicating whether an update has occurred to the virtual screen. Optionally, the function also returns any statistics that have been gathered relating to output from the host to the virtual screen. Optionally, the statistics are cleared after reading.

XHLLAPI_CURSOR

This returns the current cursor position.

XHLLAPI_SETCURSOR

This sets the current cursor position.

XHLLAPI_SAVE

This saves the current cursor position in internal XHLLAPI storage. Unlike the current cursor, the saved cursor is considered to be attached to the data on the virtual screen so that it scrolls up with the data, with screen-wrap. This function is mainly intended to support scroll-mode host applications where different instances of a particular dialogue may appear at different positions on the screen.

XHLLAPI_RESTORE

This restores the cursor to a previously saved position.

XHLLAPI_GETSAVED

This returns the saved position of the cursor.

XHLLAPI_SETSAVED

This explicitly sets the screen position of the saved cursor.

XHLLAPI_COPY_TO_PS

This copies a string from the buffer to a specified position of the virtual screen PS.

XHLLAPI_COPY_FROM_PS

This copies a string of specified length from a specified position of the virtual screen into the buffer.

XHLLAPI_SEARCH_PS

This searches the virtual screen for a specified string. The string must be null-terminated, or else its length must be supplied explicitly. According to which option is selected, either the whole screen is searched from the start, or the screen is searched from a specified position.

XHLLAPI_READMSG

This reads the contents of the virtual screen, starting at the saved cursor and ending at the position before the current cursor. This function is intended mainly to support scroll-mode host applications, especially where the quantity of host output data cannot be predicted. In this case, the cursor can be saved, a host interaction performed, and then the response retrieved without needing to supply the screen address.

XHLLAPI_DO_KEYS

This processes one or more simulated keystrokes, passed to XHLLAPI in the buffer.

CUSTOM SHELL SCRIPT EXAMPLE

An example of a custom shell script will now be given. This script is run when the gateway receives a "transfer" request from a client (by way of the TP monitor) requesting transfer of funds from a specified source account to a specified target account. The script converts this request into a dialogue with the remote application 11, so as to perform the desired transfer and to send a response back to the client.

The Script

```
failed( ) {
    case $TSH_ERRNO in
        1) tsh_return 3 "Session timed out";;
        *) tsh_return 3 "Session failure, error number
$TSH_ERRNO";;
    esac
    exit 1
}
tsh_keys "t@N"
tsh_pause "-t5 -n4 -P-0:-7 -Cnumber?" || failed
tsh_keys "00$TSH_account_id_0@N"
tsh_pause "-t5 -n1 -P-0:-7 -Cnumber?" || failed
tsh_keys "00$TSH_account_id_1@N"
tsh_pause "-t5 -n1 -P-0:-9 -Ctransfer?" || failed
tsh_keys "$TSH_samount@N"
tsh_pause "-t5 -n4 -P-0:1 -CCommand?" || failed
```

-continued

The Script

```
if tsh_compare -2 9 "Error"
then
    tsh_read statlin -2 9 71
    tsh_return 3 "Sstatlin"
    exit 1
fi
tsh_read sbalance_0 -7 25 8
tsh_read sbalance_1 -4 25 8
tsh_return 0 "TSH_sbalance_0=$sbalance_0
TSH_sbalance_1=$sbalance_1"
exit 0
```

COMMENTS ON THE SCRIPT

It is assumed that on entry to the shell script the following shell variables have been set up from fields in the buffer supplied by the client:

| TSH_account_id_0 | (Source account number) |
| TSH_account_id_1 | (Target account number) |
| TSH_samount | (Amount to transfer) |

The script contains a subroutine failed() which is called upon detection of a pause failure. The subroutine returns a failure code (3) along with a suitable error message, and then quits the script.

On entry, the script assumes that the terminal session is currently at its top level; waiting for a command identifier to be entered. The script therefore calls the tsh_keys function to type "t" and a carriage return (@N) on the virtual keyboard, requesting the transfer.

The script then calls the tsh_pause function, to wait for the host application to ask for the source account number. The arguments to the tsh_pause function have the following effect: wait until at least 4 newlines have been received (−n4), and then compare (−C) the string "number?" with the screen contents starting at position (−P) 0 rows and 7 columns before the current cursor (−0:−7) until it matches, with a timeout of 5 half-second units (−t5). Note that a row or column address prefixed by a sign (+ or −) indicates a value relative to current cursor.

"||" is a standard shell operator, which here will cause a call to the function "failed" if the tsh_pause failed on a timeout or other error.

The script then calls the tsh_keys function to type in the source account number and a carriage return on the virtual keyboard. The number is prefixed with two zeros since the host expects a seven digit account number.

The script then calls the tsh_pause function, to wait to be asked for target account number. This is similar to the previous pause, but in this case the script waits for only one newline (−n1).

The script then calls the tsh_keys function to type in the target account number and a carriage return on the virtual keyboard. Again the number is prefixed with two zeros.

The script again calls the tsh_pause function to wait to be asked for the amount to transfer. This is similar to the previous pause, but in this case the function looks for the string "transfer?" occurring nine columns before cursor (−0:−9).

The script then calls the tsh_keys function to type in the amount and a carriage return on the virtual keyboard.

The script then calls the tsh_pause function to wait for the host to perform the operation and to prompt for the next command. This will be signalled by the string "Command?" appearing on the virtual screen at the first column of the cursor row (−P−0:1), after at least 4 new lines (−n4).

Next, the script calls the tsh_compare function to see if an error message has been displayed on the virtual screen before the command prompt; that is, whether the word "Error" appears on the screen two rows above the cursor, at absolute column 9.

If an error message has been received, the script calls the tsh_read function to read the full message (71 characters) into a new shell variable "statlin", calls the tsh_return function to return this variable to the gateway process with the failure code (3), and then quits with exit status 1, indicating failure.

If, on the other hand, no error message is displayed, the script then calls the tsh_read function twice, to extract the new account balances from the virtual screen, into shell variables sbalance_0 and sbalance_1. Each of these account balances is eight characters long and starts at column 25. The first balance appears seven rows above the cursor, and the second appears four rows above the cursor.

Finally, the tsh_return function is called to return the success result code (0) to the SSL, together with a result string constructed from the shell variables indicating the new balances. The script then quits with exit status 0, indicating success.

SOME POSSIBLE MODIFICATIONS

It will be appreciated that many modifications may be made to the system described above without departing from the spirit and scope of the present invention.

For example, the host system 10 may use a different type of terminal, such as a block mode terminal. This may require a different version of the XHLLAPI, tailored to the new terminal type, and also some modification of the custom shell scripts to cope with the different terminal protocols. However, the interface between the XHLLAPI and the SSL remains constant, and so no modification is required to the SSL.

In other embodiments of the invention, the legacy application 11 may reside in the same computer 13 as the gateway 20, in which case the gateway can communicate directly with the legacy application, without the need for the communications module 21.

The system may be based on transaction processing environments other than the TUXEDO environment described above. In that case, the gateway interface module 30 would have to be modified to interface with the different environment. However, it should be noted that the SSL is not dependent on TUXEDO and therefore the rest of the gateway would be unaffected.

The shell scripts and shell functions may be replaced by equivalent C routines, to improve efficiency.

The SSL may be considered as providing an interface between shell scripts and the XHLLAPI functions. It can therefore be used to provide a service to standard shell scripts (i.e. those not working on behalf of some client program) to enable them to perform terminal emulations.

We claim:

1. A computer system comprising:

(a) a first processing environment, including a first application;

(b) a second processing environment including a second application;

(c) terminal emulation means for storing a virtual screen;

(d) communication means for coupling said terminal emulation means to said second application, to allow said second application to write prompts to said virtual screen, to read data from said virtual screen, and to write data into said virtual screen; and (e) conversion means, interconnecting said first application with said terminal emulation means, for receiving service requests from said first application and converting each of said service requests into a dialog wherein the conversion means waits for the second application to write a series of prompts into said virtual screen and, in response to each of said prompts, writes data derived from said service request into said virtual screen, and wherein the conversion means constructs response messages containing data derived from said virtual screen and returns said response messages to said first application.

2. A computer system according to claim 1 wherein said conversion means comprises means for executing scripts in a scripting language.

3. A computer system according to claim 1 wherein said first application comprises a transaction processing monitor.

4. A computer system according to claim 3 wherein said second application comprises a banking application.

5. A method of operating a computer system comprising a first processing environment, a second processing environment, and a gateway interconnecting said first processing environment and said second processing environment, the method comprising the steps:

(a) running a first application in said first processing environment;

(b) running a second application in said second processing environment;

(c) storing a virtual screen in said gateway;

(d) causing said second application to write prompts into said virtual screen, to read data from said virtual screen, and to write data into said virtual screen;

(e) causing said first application to send a service request to the gateway; and (f) in response to said service request, causing the gateway to conduct a dialog wherein the gateway waits for the second application to write a series of prompts into said virtual screen and, in response to each of said prompts, writes data derived from said service request into said virtual screen, and wherein the gateway constructs response messages containing data derived from said virtual screen and returns said response messages to said first application.

* * * * *